United States Patent
Imamura (10) Patent No.: US 12,515,316 B2
(45) Date of Patent: Jan. 6, 2026

(54) OPERATION APPARATUS, ROBOT SYSTEM, MANUFACTURING METHOD, CONTROL METHOD, AND RECORDING MEDIUM

(71) Applicant: CANON KABUSHIKI KAISHA, Tokyo (JP)

(72) Inventor: Seigo Imamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 18/477,344

(22) Filed: Sep. 28, 2023

(65) Prior Publication Data
US 2024/0109188 A1    Apr. 4, 2024

(30) Foreign Application Priority Data

Sep. 30, 2022  (JP) .................. 2022-157704
Jul. 5, 2023   (JP) .................. 2023-110814

(51) Int. Cl.
*B25J 9/16*    (2006.01)
*B25J 13/06*   (2006.01)

(52) U.S. Cl.
CPC ............. *B25J 9/1605* (2013.01); *B25J 13/06* (2013.01)

(58) Field of Classification Search
CPC ....... B25J 9/1605; B25J 13/06; G05B 19/409; G05B 2219/39438; G05B 2219/39443
USPC ........................................... 700/264
See application file for complete search history.

(56) References Cited

U.S. PATENT DOCUMENTS

| | | | |
|---|---|---|---|
| 2015/0239120 A1* | 8/2015 | Yamamoto | H04L 67/10 901/3 |
| 2018/0297202 A1* | 10/2018 | Nishitani | G06F 30/20 |
| 2021/0154826 A1* | 5/2021 | Watanabe | B25J 3/00 |
| 2022/0250237 A1* | 8/2022 | Nagashima | G06F 3/04847 |
| 2024/0001563 A1* | 1/2024 | Tanaka | B25J 19/06 |
| 2024/0058963 A1* | 2/2024 | Fang | B25J 13/06 |

FOREIGN PATENT DOCUMENTS

| | | |
|---|---|---|
| JP | 2001255906 A | 9/2001 |
| JP | 2003165079 A | 6/2003 |
| JP | 2009119579 A | 6/2009 |
| JP | 2016068242 A | 5/2016 |

* cited by examiner

*Primary Examiner* — Kira Nguyen
(74) *Attorney, Agent, or Firm* — Canon U.S.A., Inc., IP Division (57) ABSTRACT

An operation apparatus configured to communicate with a robot controller for controlling a robot, acquire a pressed state of an enable switch, display a virtual robot corresponding to the robot in a virtual environment, and operate the robot or the virtual robot by an operation of the operation apparatus, includes a determination unit configured to determine the pressed state of the enable switch, and a processing unit configured to issue a switching instruction to switch between a state in which the robot is operated and a state in which the virtual robot is operated, depending on a determination of the pressed state of the enable switch determined by the determination unit.

22 Claims, 12 Drawing Sheets

OPERATION APPARATUS, ROBOT SYSTEM, MANUFACTURING METHOD, CONTROL METHOD, AND RECORDING MEDIUM

FIELD OF THE DISCLOSURE

The present disclosure relates to an operation apparatus.

DESCRIPTION OF THE RELATED ART

The number of teaching pendants (TPs) including a simulator function has been increased due to the advancement of hardware functionality. A mode of the TP provided with the simulator function needs to be switched between a simulation mode and an actual machine mode. A mode change switch such as a button on a Graphical User Interface (GUI) or a physical switch is used for switching the mode of the TP between the simulation mode and the actual machine mode. For example, Japanese Patent Application Laid-open No. 2001-255906 discusses a configuration in which a mode change switch for switching a mode between a normal mode and a simulation mode is provided.

SUMMARY

According to an aspect of the present disclosure, an operation apparatus configured to communicate with a robot controller for controlling a robot, acquire a pressed state of an enable switch, display a virtual robot corresponding to the robot in a virtual environment, and operate the robot or the virtual robot by an operation of the operation apparatus, includes a determination unit configured to determine the pressed state of the enable switch, and a processing unit configured to issue a switching instruction to switch between a first state in which the robot is operated and a second state in which the virtual robot is operated, depending on the pressed state of the enable switch determined by the determination unit.

Further features of the present disclosure will become apparent from the following description of embodiments with reference to the attached drawings.

DESCRIPTION OF THE EMBODIMENTS

In the configuration discussed in Japanese Patent Application Laid-open No. 2001-255906, a user needs to press an enable switch to operate a robot, which is an actual machine. More specifically, after switching a mode to a normal mode with a mode change switch, the user further presses the enable switch to operate the actual machine. At this time, in a case where the user forgets to switch the modes and tries to operate the actual machine by pressing the enable switch, the user cannot operate the actual robot.

Thus, in a case where the switching of the mode is required in addition to the operation of the enable switch, the operability of a teaching pendant (TP) may deteriorate.

The present disclosure is provides a technique for improving the operability of the TP.

Hereinbelow, embodiments of the present disclosure will be described with reference to the attached drawings. However, the embodiments to be described below are merely examples of the present disclosure, and the present disclosure is not limited to the embodiments. In addition, common configurations are to be described with cross-reference to a plurality of drawings, and the descriptions of configurations with common symbols assigned thereto are omitted as appropriate. Units with a same name can be discriminated by adding "an n-th unit", like "a first unit", or "a second unit".

Figure 1:
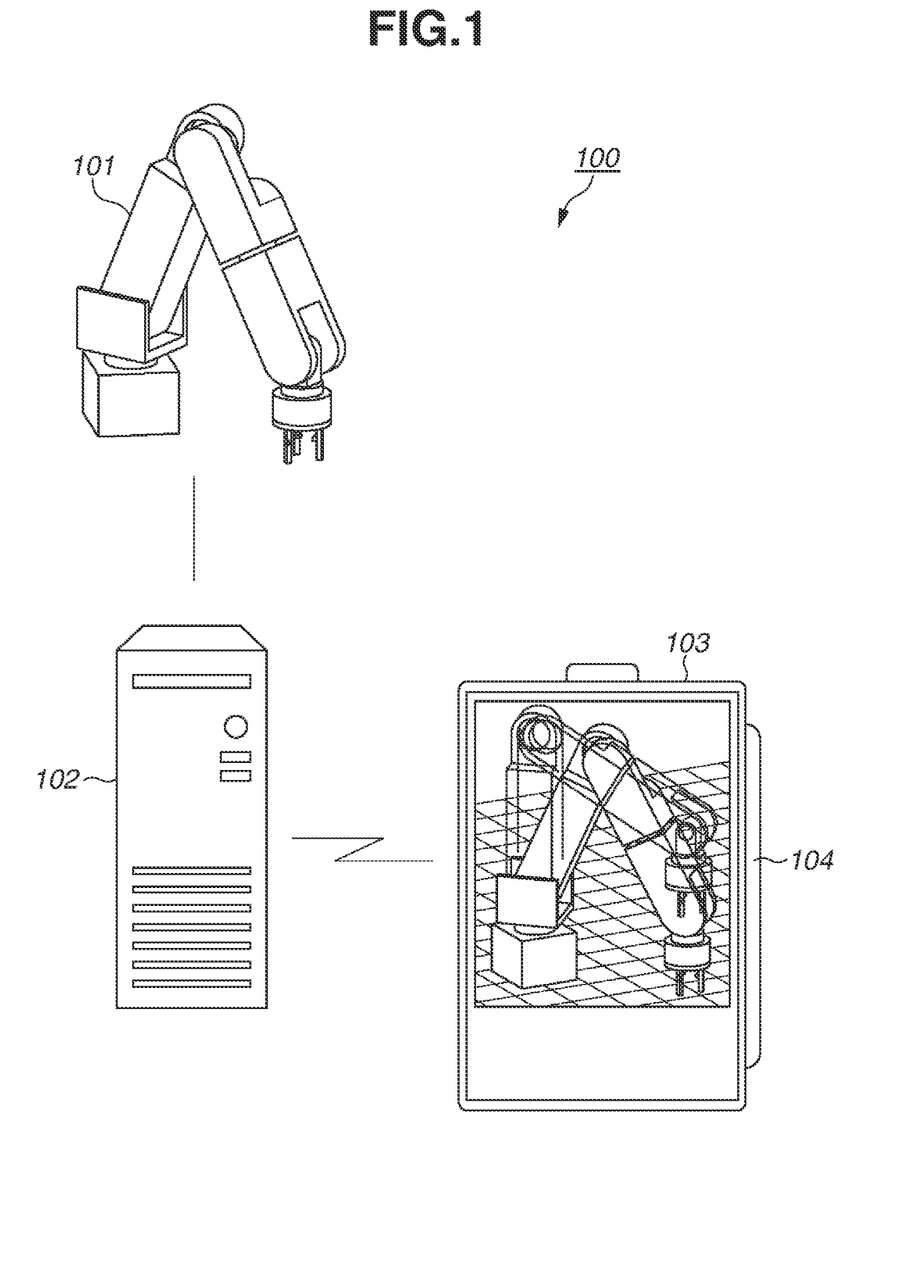
FIG. 1 is a diagram illustrating a robot system.

FIG. 1 is a diagram illustrating a robot system 100 according to a first embodiment. The robot system 100 includes a robot 101 serving as an actual robot, a control apparatus 102 for controlling the robot 101, and a teaching pendant (TP) 103 for giving operation instructions to the robot 101 via the control apparatus 102. The robot 101 is used for use applications such as article manufacturing and article conveyance. The robot 101 is positioned and disposed, for example, on a platform or a floor (not illustrated).

In the present embodiment, a robot main body performs operations of conveying a grasped work and assembling the work to another work. In this way, industrial products or articles can be manufactured. The orbital data may be calculated by a simulator.

The control apparatus 102 controls the robot 101 based on operation information about the robot 101. The control apparatus 102 acquires operation information about the TP 103 to generate the operation information about the robot 101.

The robot 101 is a manipulator. The robot 101 is fixed on a platform. For example, a tray on which a work serving as a conveyed object is placed and another work serving as an assembled target is placed, around the robot 101. The work is gasped by the robot 101, conveyed to a position of the other work, and the work and the other work are assembled. In this way, an article is manufactured.

The robot 101 and the control apparatus 102 are communicably connected via a wire. The robot 101 includes a robot arm and a robot hand that is an example of an end effector.

The robot arm is a vertical articulated robot arm. The robot hand is supported by the robot arm. The robot hand is attached to a predetermined part of the robot arm, for example, to the leading end of the robot arm. The robot hand is configured to be capable of grasping a work.

The robot arm according to the present embodiment includes a plurality of links connected with a plurality of rotatably driven joints (e.g., six joints). The base portion of the robot arm is fixed on the platform. Each joint of the robot arm is provided with a motor serving as a drive source for driving the joint, a deceleration unit, and an encoder serving as a position detection unit for detecting a motor rotational angle. The arranging position and the output method of the encoder are not specifically limited.

The robot hand is attached to the leading end of the robot arm. The robot 101 can be made to take various postures by driving the joints of the robot arm.

Figure 2:
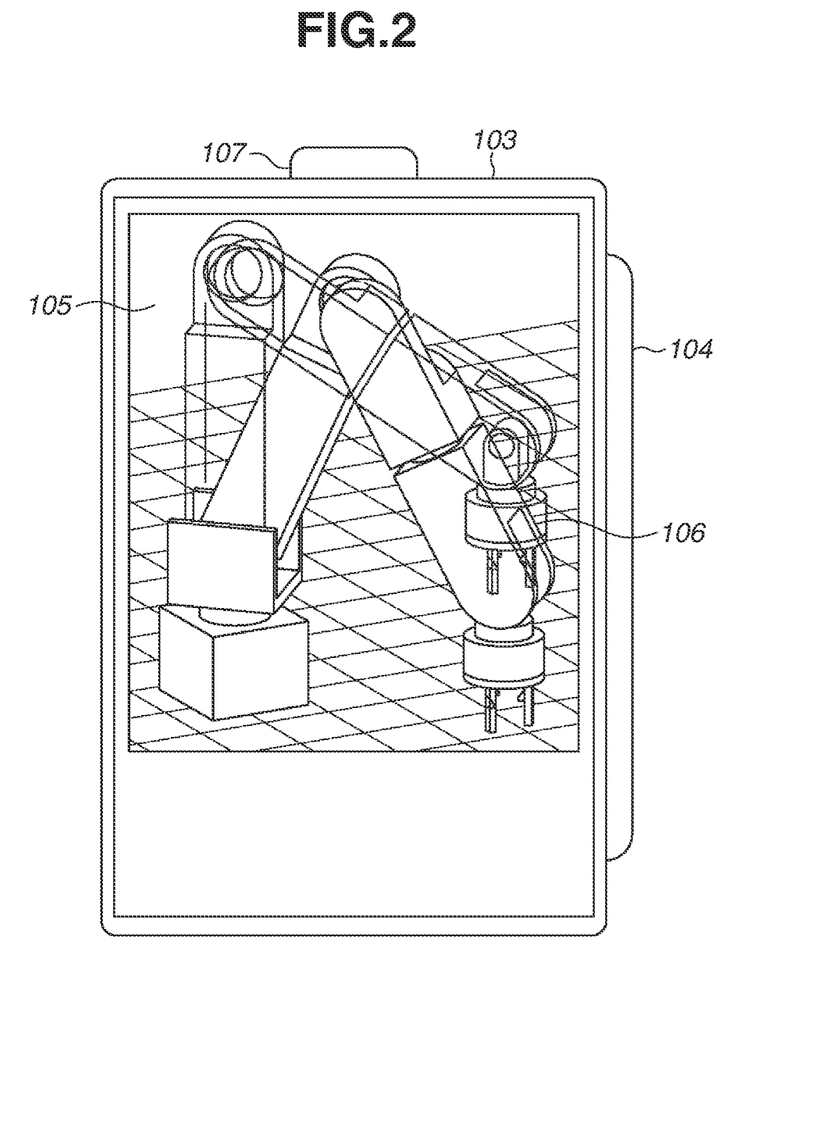
FIG. 2 is a configuration diagram illustrating a teaching pendant.

FIG. 2 is a configuration diagram illustrating the TP 103 according to the present embodiment. The TP 103 includes a computer, and functions as a simulator, in addition to an instruction apparatus. In the present embodiment, the TP 103 generates instruction data by a computer simulation, i.e., an off-line instruction to confirm the operation of the robot 101 in advance, by performing the simulation. The instruction data generated by the TP 103 is output to the control apparatus 102. The output method of the instruction data to the control apparatus 102 is not specifically limited. For example, the instruction data generated by the TP 103 may be output to the control apparatus 102 thorough a wired communication or a wireless communication, or via a storage device (not illustrated). The TP 103 is provided with an enable switch (hereinbelow, referred to as ESW) 104. The ESW 104 is a switch provided to operate the robot 101, and the robot 101 is controlled to be unable to move by a user's instruction through the TP 103 while the ESW 104 is being pressed. On the other hand, in a case where the ESW 104 is not being pressed, the robot 101 is controlled to be able to move by a user's instruction through the TP 103 while the ESW 104 is not being pressed. The ESW 104 is a three-position switch including a first step, a second step, and a third step. In the present embodiment, among the three steps, the ESW 104 is OFF (non-pressed state, second state) in the first and third steps, and the ESW 104 is ON (pressed state, first state) in the second step. The ESW 104 may be externally attached to the TP 103, and the ESW 104 may be any type of switch as long as the TP 103 can acquire the pressed state of the ESW 104. In teaching, while the ESW 104 is ON, the robot 101 can be operated. The first, second, and third steps of the ESW 104 correspond to a non-pressed state, a half-pressed state, and a full-pressed state of the ESW 104, respectively. In a case where the ESW 104 turns OFF while the robot 101 is being operated, the current supplied to the motor serving as a drive source of the robot 101 is cut off. In this way, it is possible to instantaneously stop the robot 101 even in a case where an unintended operation of the robot 101 occurs or an unintended user's operation is given. In this way, it is possible to secure user's safety.

Figure 3:
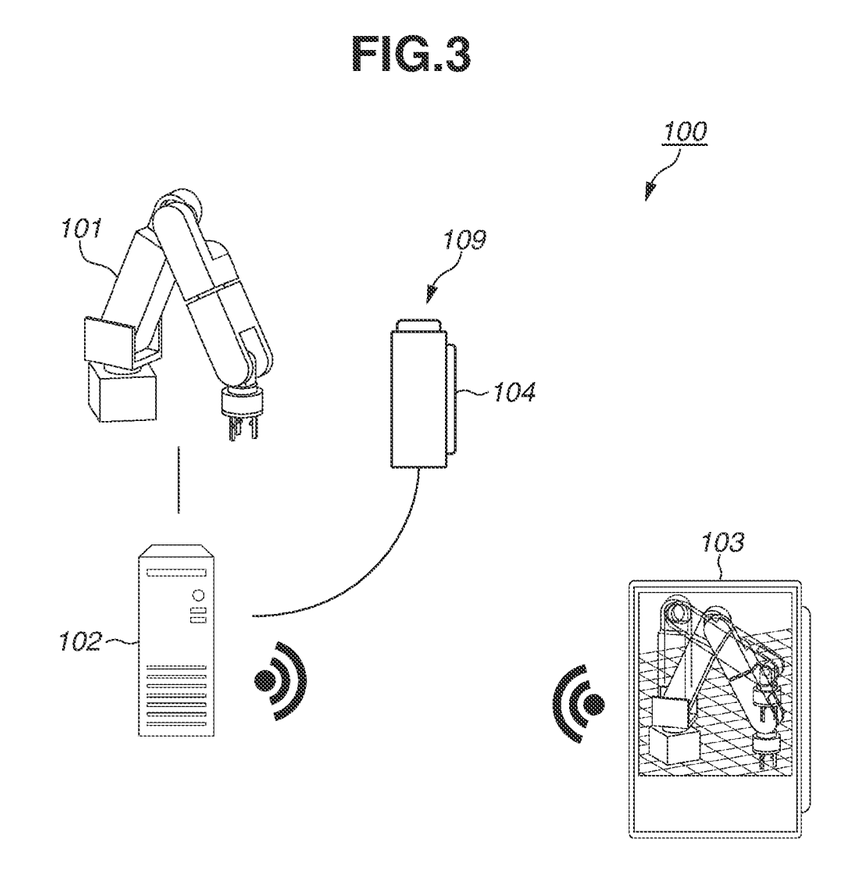
FIG. 3 is a diagram illustrating a modification example of the teaching pendant.

As illustrated in FIG. 3, the ESW 104 can be an apparatus 109 independent from the TP 103, not provided on the TP 103. The apparatus 109 includes the ESW 104 and an emergency stop button, and is present independent from the TP 103. With this configuration, it is possible to reduce the risk of operating the robot 101 through the TP 103 in a state where the user presses the ESW 104 by mistake that may occur in a case where the user uses the TP 103 with the ESW 104 provided thereon. In this way, it is possible to further improve the user's safety. At this time, the TP 103 may be wirelessly connected with the control apparatus 102.

In the present embodiment, it is described that the ESW 104 is OFF in the first and third steps, and the ESW 104 is ON in the second step, but various functions can be assigned to the respective steps. For example, when the ESW 104 changes to the third step after the ESW 104 turns ON in the second step, the robot 101 can be operated even if the ESW 104 is not kept pressed. In this case, if the user desires to switch the mode to the simulation mode, the user can switch the ESW 104 to the first step by pressing the ESW 104 again, to set the ESW 104 in the OFF state. By switching the ESW 104 to the second step, it is possible to match the posture of a virtual robot 106 to the posture of the robot 101, and by switching the ESW 104 to the third step, it is possible to match the posture of the robot 101 to the posture of the virtual robot 106.

The TP 103 is provided with a display unit 105, and can display on the display unit 105 a virtual environment for displaying the virtual robot 106 therein. The display unit 105 is formed by stacking a so-called touch panel on the display.

In the present disclosure, the robot 101 is a robot operable in the actual machine mode, and the virtual robot 106 is a robot operable in the simulation mode displayed on the display unit 105 of the TP 103.

The TP 103 is provided with an emergency stop button. In a case where the robot 101 is about to hit an object present around the robot 101 while the robot 101 is changing the posture based on the instructed operation, the robot 101 stops when the user presses the emergency stop button. In this way, it is possible to reduce the risk of hitting when the robot 101 is used.

Figure 4:
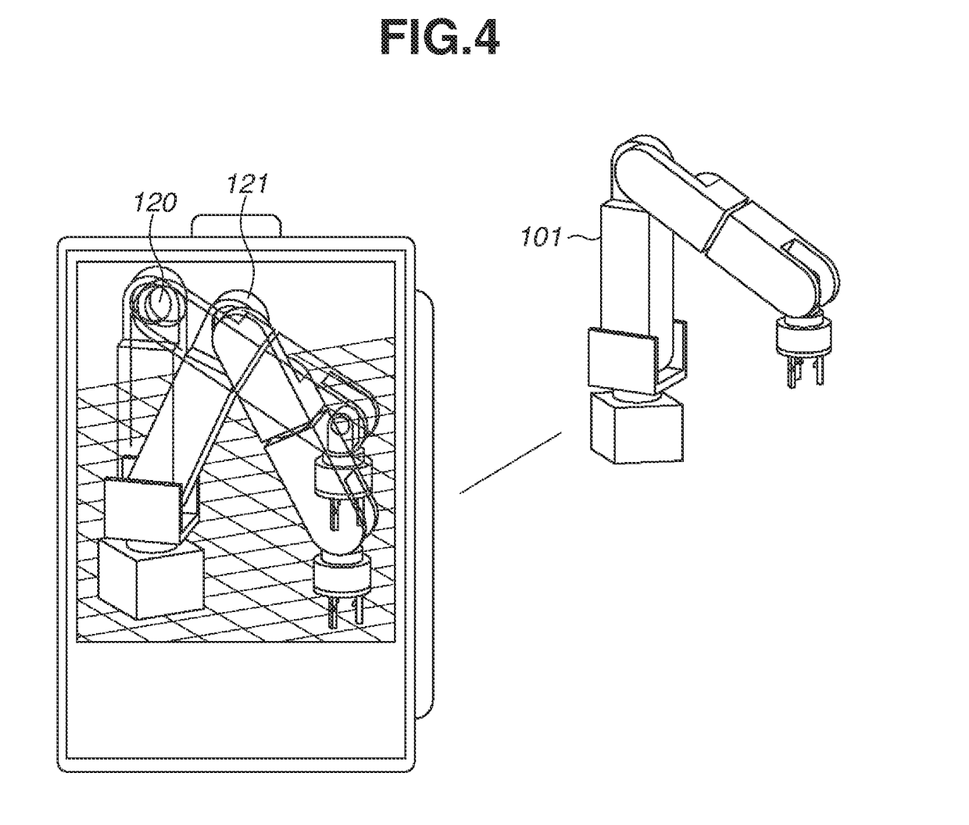
FIG. 4 is a diagram illustrating a relationship between a robot model and an actual robot.

FIG. 4 is a diagram illustrating a robot model 120 and a robot model 121 displayed in a virtual environment. One of the robot model 120 and the robot model 121 indicates a robot in simulation, and the other one displays the posture of the robot 101 in the virtual environment. For example, the robot model 120 indicates a robot in simulation, and the robot model 121 displays the posture of the robot 101 in the virtual environment. One of the robot model 120 and the robot model 121 can be displayed in a semi-transparent manner to improve user's visibility, and, for example, the robot model 121 indicating the posture of the robot 101 can be displayed in the virtual environment in a semi-transparent manner.

Figure 5:
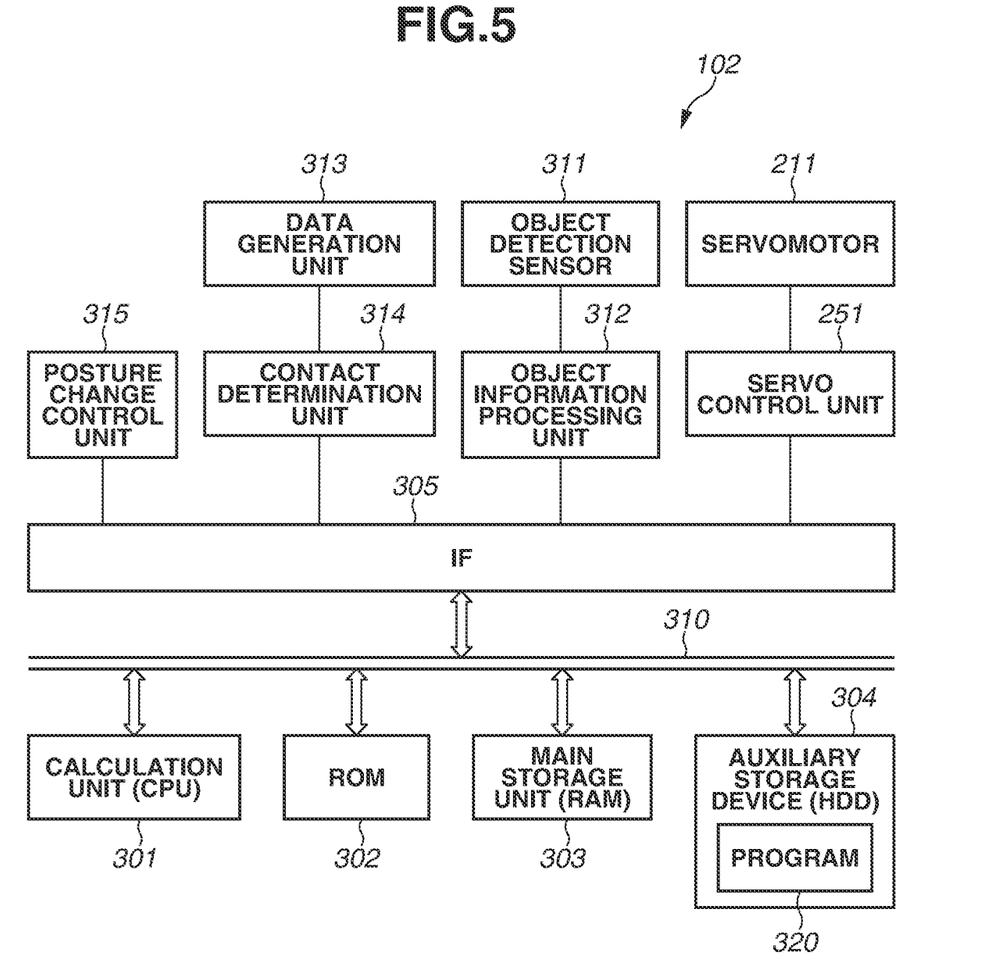
FIG. 5 is a block diagram illustrating a control unit.

FIG. 5 is a block diagram illustrating a configuration of a control unit of the control apparatus 102. The control unit includes a computer, and includes a calculation unit 301 serving as a control unit. The calculation unit 301 includes a Central Processing Unit (CPU), or an Application Specific Integrated Circuit (ASIC). Alternatively, the calculation unit 301 includes a Field-Programmable Gate Array (FPGA). The control unit includes a Read Only Memory (ROM) 302 and a main storage unit 303 such as a Random Access Memory (RAM), as a storage unit. The ROM 302 stores a basic program such as a Basic Input/Output System (BIOS). The main storage unit 303 is a storage unit to temporarily store various data such as a calculation result of the calculation unit 301. The control unit includes an auxiliary storage device 304 such as a Hard Disk Drive (HDD) and a Solid State Drive (SSD), as a storage unit.

The auxiliary storage device 304 stores a result of calculation processing of the calculation unit 301, externally acquired data, and the like. The TP 103 includes an interface (IF) 305.

The ROM 302, the main storage unit 303, the auxiliary storage device 304, and the IF 305 are connected to the calculation unit 301 via a bus 310. An operation apparatus such as a console panel and the TP 103, a display apparatus such as a display and a lamp may be connected to the IF 305. The IF 305 can include an information input unit for inputting information in the control unit. The operation apparatus is connected to the information input unit of the control unit via a wired connection and/or a wireless connection. Since the operation apparatus is connected to the control unit in this way, the operation apparatus can control the control unit. The IF 305 can include an information output unit for outputting information to be displayed on the display apparatus as a display unit to display the information on the display apparatus. The information output unit can include a graphic controller and a microcomputer. Since the display apparatus is connected to the control unit in this way, the display apparatus can display the information.

The calculation unit 301 performs various kinds of processing for the operation of the robot 101 based on a program 320 stored in the auxiliary storage device 304. In this way, the calculation unit 301 issues an instruction to move the robot 101 to a desired position, i.e., to transform the robot 101 to a desired posture. The calculation unit 301 outputs data about a position instruction to a servo control unit 251 of the robot 101 via the bus 310 and the IF 305 at predetermined intervals.

When the robot 101 changes its posture, the calculation unit 301 instructs the robot 101 to move to a desired position. The servo control unit 251 outputs a current to the joint unit provided in the robot 101 base on the position instruction to the robot 101, to control the driving of an electric motor such as a servomotor 211. The calculation unit 301 can control the posture change of the robot 101 by controlling the driving of the electric motor.

The control unit can change the posture of the robot 101 while changing response characteristics to an external force applied to the robot 101. In this way, it is possible to control the robot 101 while reducing the load on the motor such as the servomotor 211.

The control unit can include an object information processing unit 312, a data generation unit 313, a contact determination unit 314, and a posture change control unit 315. In the control unit, the object information processing unit 312, the contact determination unit 314, the data generation unit 313, and the posture change control unit 315 are connected to the IF 305. At least any one of the object information processing unit 312, the contact determination unit 314, and the posture change control unit 315 can be provided in the robot 101. For example, the data generation unit 313 can be provided in the joint unit.

The data generation unit 313 generates data (analog data or digital data) that can be treated by the contact determination unit 314, from a signal detected and output by a sensor for detecting the contact with the robot 101, and outputs the generated data to the contact determination unit 314. The value indicated by the data generated by the data generation unit 313 is a value corresponding to a physical quantity detected by the sensor for detecting the contact with the robot 101. The data generation unit 313 can also be referred to as a contact detection unit. The contact determination unit 314 can determine the presence of an object contacting the robot 101, by analyzing the contact information output from the data generation unit 313 provided in the control unit or provided outside.

The robot 101 or the control unit can be provided with an object detection sensor 311. The object detection sensor 311 is a sensor that can detect an object present around the robot 101. Various kinds of sensors such as an image sensor, a distance measurement sensor, an ultrasonic sensor, and a radar sensor can be used as the object detection sensor 311. The distance measurement sensor may be a Time of Flight (ToF) type sensor. The object detection sensor 311 is connected to, for example, the IF 305.

The object information processing unit 312 analyzes object information output from the object detection sensor 311.

Through this analysis, the object information processing unit 312 can determine the object present within the movable range of the robot 101 or can calculate the distance to the object.

The posture change control unit 315 controls the posture change based on data about the object present within the movable range of the robot 101 output from the object information processing unit 312 and the data about the presence of the contact object output from the contact determination unit 314.

The robot system 100 according to the present embodiment can detect the contact of an object with the robot 101 using a sensor for detecting contact. The control unit can control the robot 101 based on the detection of the contact. The robot 101 can detect the presence of the object around the robot 101 using the object detection sensor 311. The control unit can control the robot 101 based on the detection of the presence of the object. The detected object can be displayed on the display unit 105 of the TP 103.

Figure 6:
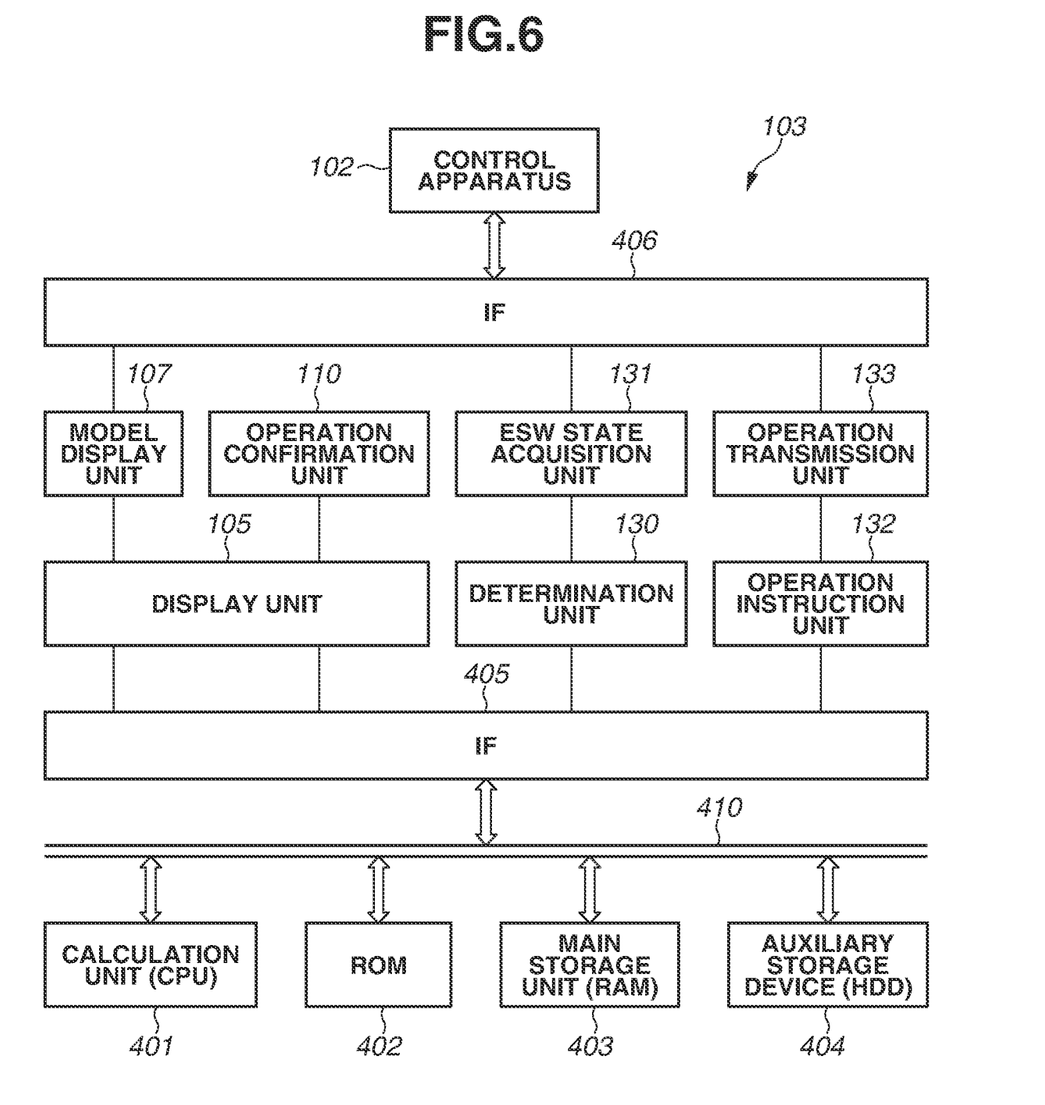
FIG. 6 is a block diagram illustrating the teaching pendant.

FIG. 6 is a block diagram illustrating a configuration of the TP 103. A calculation unit 401, a ROM 402, a main storage unit 403, an auxiliary storage unit 404, an IF 405, and a bus 410 are similar to the calculation unit 301, the ROM 302, the main storage unit 303, the auxiliary storage device 304, the IF 305, and the bus 310 described with reference to FIG. 4, and the descriptions of these units are omitted. In a case where the control apparatus 102 includes the calculation unit 401, the ROM 402, the main storage unit 403, and the auxiliary storage unit 404, the TP 103 does not need to include them.

The display unit 105, a determination unit 130, and an operation instruction unit 132 of the TP 103 are connected to the IF 405. The display unit 105 includes a model display unit 107 for displaying the virtual robot 106 in a virtual environment, and an operation confirmation unit 110 for confirming whether to issue an operation instruction to the virtual robot 106 or the robot 101. The model display unit 107 acquires the state of the robot 101, and displays the model of the robot 101. The posture of the robot 101 and the posture of the model of the robot 101 are the same.

The determination unit 130 connects to an ESW state acquisition unit 131 that acquires a pressed state of the ESW 104. The determination unit 130 determines whether to operate the robot 101 or the virtual robot 106 based on the pressed state of the ESW 104 acquired by the ESW state acquisition unit 131. In the present embodiment, the ESW state acquisition unit 131 connects to the control apparatus 102 via an IF 406, but if the ESW 104 directly connects to the TP 103, the ESW state acquisition unit 131 does not need to connect to the control apparatus 102 via the IF 406.

The operation instruction unit 132 acquires the state of the simulation model, and gives a target position to an operation transmission unit 133 to operate the robot 101. The operation transmission unit 133 transmits the target position to the control apparatus 102 via the IF 406, to operate the robot 101 so as to take the same posture as that of the virtual robot 106. The IFs 405 and 406 include a communication device supporting Ethernet, Universal Serial Bus (USB), or the like.

In FIG. 6, the TP 103 connecting to the control apparatus 102 via the IF 406 is described, but the TP 103 may be formed of software in the control apparatus 102.

Figure 7:
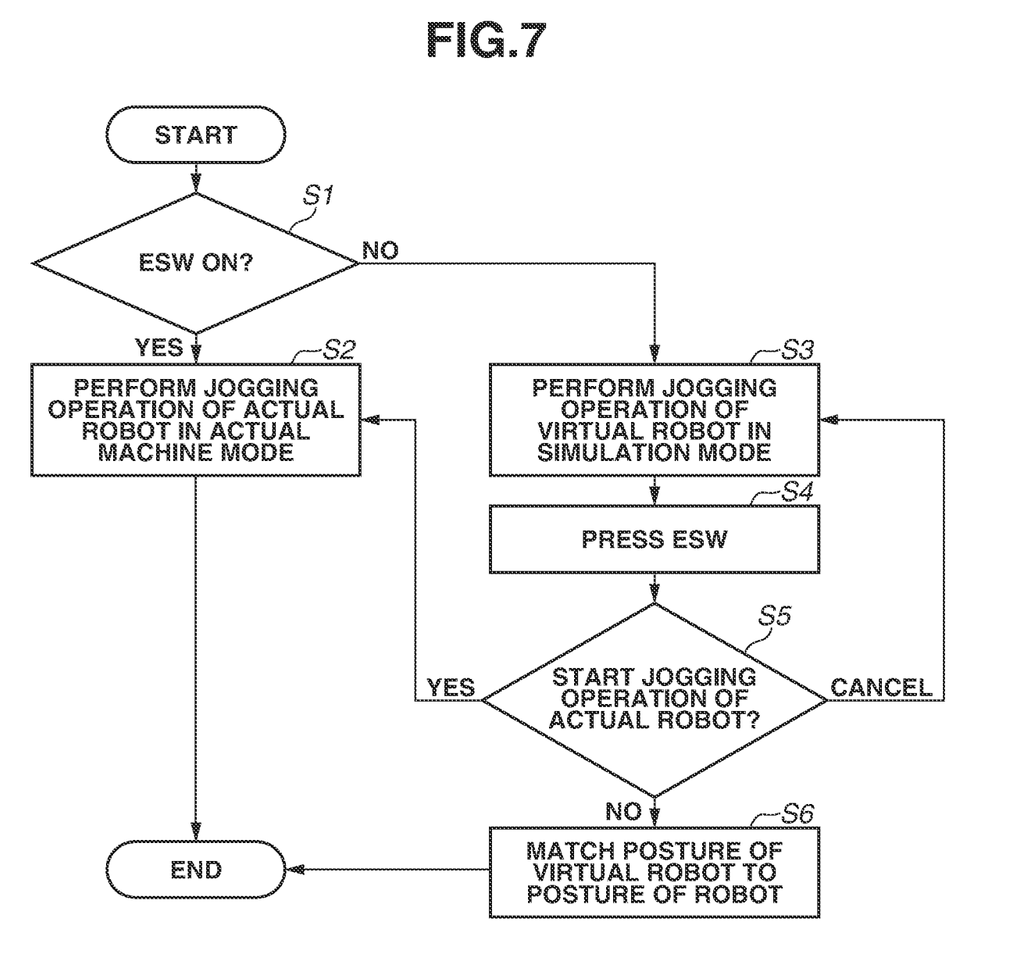
FIG. 7 is a flowchart illustrating an operation flow of a robot.

FIG. 7 is a flowchart illustrating a series of operations of the robot 101 according to the present embodiment. In step S1, the ESW state acquisition unit 131 acquires the pressed state of the ESW 104, and the determination unit 130 determines whether the ESW 104 is ON. In step S1, in a case where the determination unit 130 determines that the ESW 104 is ON (YES in step S1), the processing proceeds to step S2. In step S2, the mode is an actual machine mode in which the robot 101 is operated, and a jogging operation of the actual robot 101 is performed based on the user's operation input. Then, the processing ends.

In step S1, in a case where the determination unit 130 determines that the ESW 104 is OFF (NO in step S1), the processing proceeds to step S3. In step S3, the mode is a simulation mode, and a jogging operation of the virtual robot 106 is performed based on the user's operation input. After the operation in step S3, in a case where the ESW 104 is pressed and the processing proceeds to step S4, then, the processing proceeds to step S5. In step S5, an operation check is performed.

In the operation check performed in step S5, a user selects any one of "to match the posture of the virtual robot 106 in simulation in the virtual environment to the posture of the robot 101", "to start a jogging operation of the robot 101", or "to cancel the instruction of the ESW 104 and to continue the jogging operation of the virtual robot 106". In a case where the user selects "to match the posture of the virtual robot 106 in simulation in the virtual environment to the posture of the robot 101" (NO in step S5), the processing proceeds to step S6. In step S6, the posture of the virtual robot 106 is matched to the posture of the robot 101. In a case where the user selects "to start a jogging operation of the robot 101" (YES in step S5), the processing proceeds to step S2. In step S2, the jogging operation of the robot 101 is started. In step S5, in a case where the user cancels the instruction of the ESW 104 (CANCEL in step S5), the processing returns to step S3. In step S3, the jogging operation of the virtual robot 106 is continued. Although it is not described with reference to FIG. 4, the posture of the virtual robot 106 may be synchronized with the posture of the robot 101. In step S4, the mode changing may not be performed when the ESW 104 is shifted from the third step to the second step.

As described above, the TP 103 includes the operation instruction unit 132 for switching an operation between the jogging operation of the robot 101 and the jogging operation of the virtual robot 106 depending on the pressed state of the ESW 104, and the operation transmission unit 133. Conventionally, in a case where a mode change switch is provided in addition to the ESW 104, to move the robot 101 from the state where the virtual robot 106 is moved, a user needs to switch the mode by the mode change switch, and then press the ESW 104. Thus, according to the present embodiment, the mode can be switched between the mode to move the robot 101 and the mode to move the virtual robot 106, using the ESW 104 as a trigger. In this way, it is possible to reduce the complexity of the mode changing operation by the user, and improve operability of the TP 103.

The state in which the ESW 104 is being pressed is a state indicating that a user desires to operate the robot 101. Accordingly, it is possible to improve the operability of the robot 101 while securing the user's safety by switching the modes using the ESW 104 as a trigger.

Figure 8A:
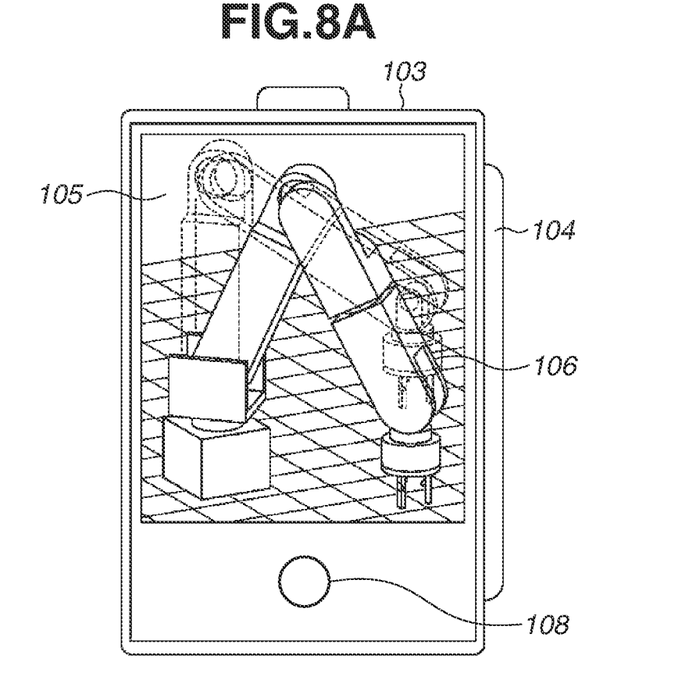
FIGS. 8A and 8B are a diagram and a flowchart illustrating a teaching pendant provided with a mode change switch and an operation flow, respectively.
Figure 8B:
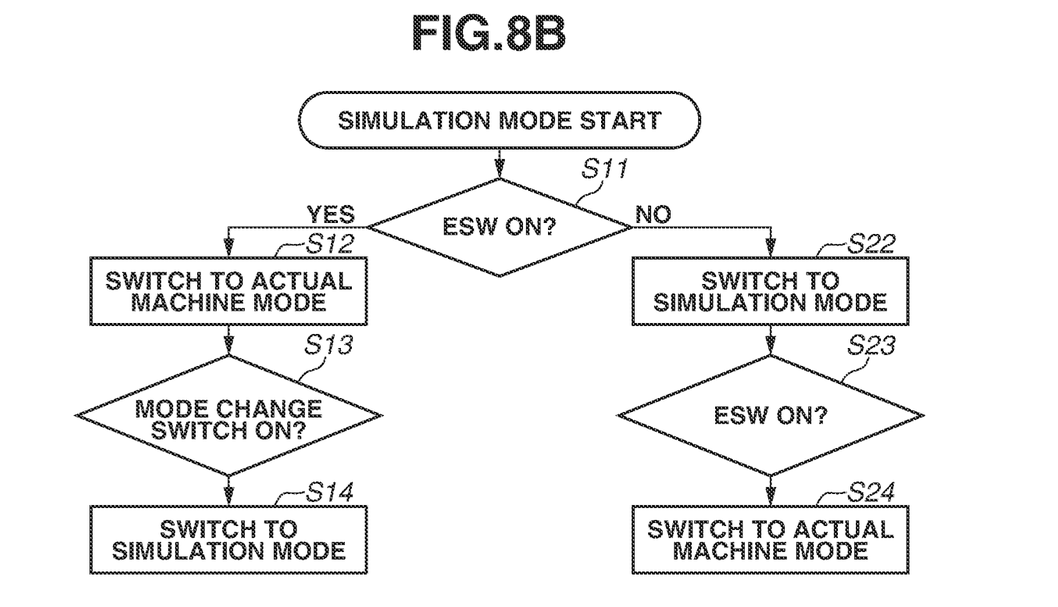

As illustrated in FIG. 8A, a mode change switch 108 may be provided in addition to the ESW 104, and a switch corresponding to a usage can be used. For example, as illustrated in FIG. 8B, the switching from the simulation mode to the actual machine mode (S11→S12, and S22→S23→S24) is performed by the ESW 104. The switching from the actual machine mode to the simulation mode (S12→S13→S14) may be performed by the mode change switch 108. In this case, when the mode changing is performed by the ESW 104, the mode change switch 108 is configured also to switch to a mode to automatically move the robot 101.

In this way, since the switching to the simulation mode is performed by the mode change switch 108, it is possible to reduce the risk of operating the actual robot 101 by misunderstanding the mode as the simulation mode. It is possible to improve the operability of the robot 101 because the switching to the actual machine mode is performed by the ESW 104. As described above, the switching from the simulation mode to the actual machine mode is performed using the ESW 104, and the switching from the actual machine mode to the simulation mode is performed using the mode change switch 108 different from the ESW 104. In this way, it is possible to improve the operability of the robot 101 while securing the user's safety.

A modification example that can improve operability of the TP 103 will be described. The control of a series of operations illustrated in FIG. 7 is performed by the calculation unit 401 of the TP 103, but may be performed by the calculation unit 301 of the control unit.

In a case where the ESW 104 turns ON when the posture of the robot 101 and the posture of the virtual robot 106 are different, it is possible to confirm whether to issue an operation instruction to the robot 101. The confirmation may be performed using a popup display to be described below, or may be performed by voice and sound.

Figure 9:
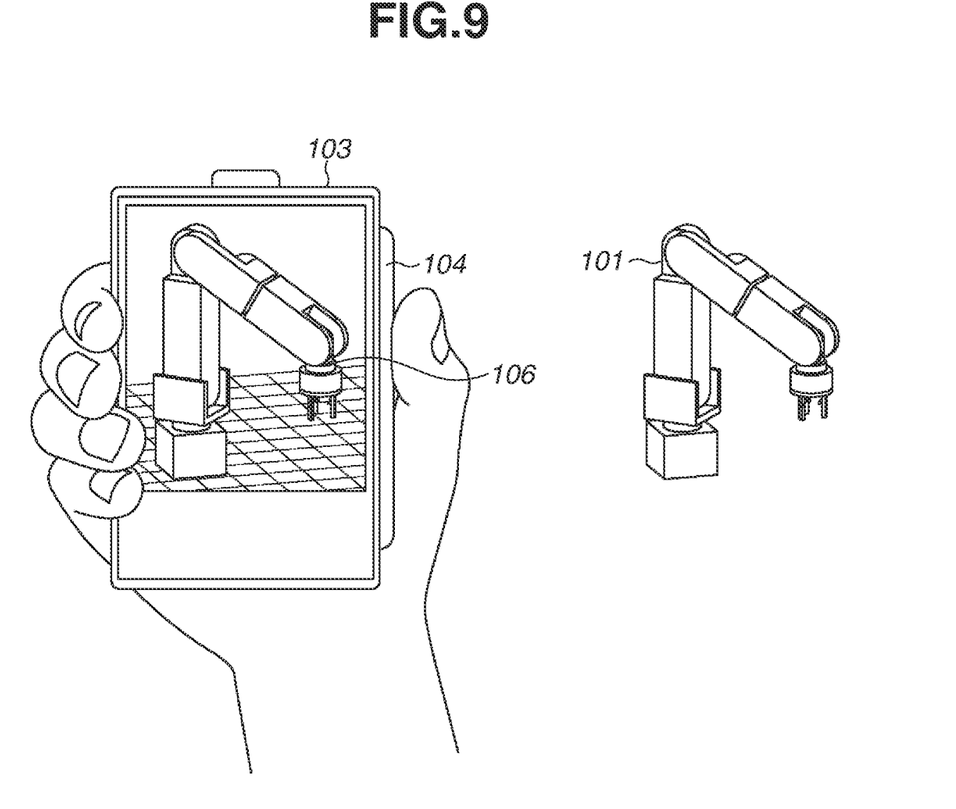
FIG. 9 is a diagram illustrating a state where a user presses an enable switch.

As illustrated in FIG. 9, when the ESW 104 turns ON, the posture of the virtual robot 106 may be set to automatically match the posture of the robot 101. When the ESW 104 changes from ON to OFF, the posture of the virtual robot 106 can be synchronized with the posture of the robot 101.

Figure 10:
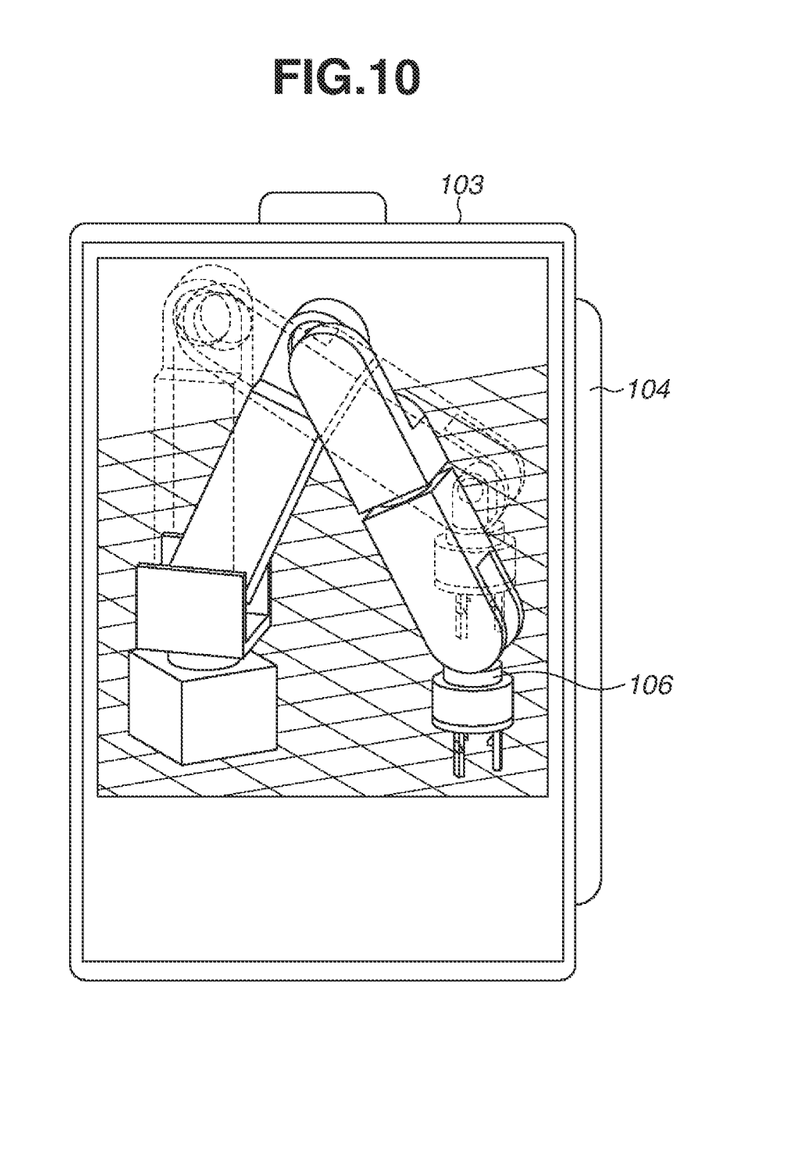
FIG. 10 is a diagram illustrating the robot before and after a posture change.

In addition, as illustrated in FIG. 10, the posture of the robot 101 before being changed can be displayed in the virtual environment by dotted lines, and the posture of the robot 101 while being changed can be displayed in the virtual environment. In this case, when the ESW 104 is released, the previous posture of the robot 101 displayed by the dotted lines may be automatically deleted, or the popup to be described below may be displayed to inquire whether to delete the previous posture of the robot 101.

Figure 11:
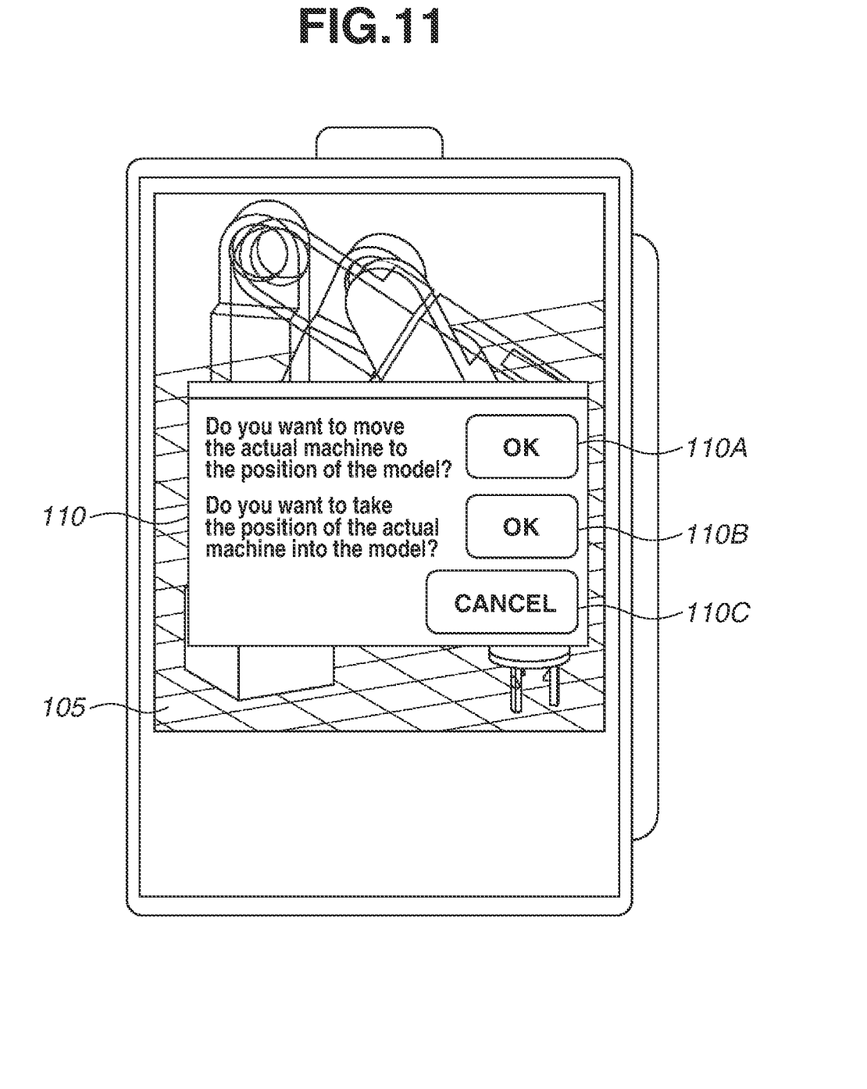
FIG. 11 is a schematic diagram illustrating an operation confirmation by an operation confirmation unit.

As illustrated in FIG. 11, the TP 103 can perform the operation confirmation by, for example, displaying a confirmation popup on the display unit 105. The confirmation popup is controlled by the operation confirmation unit 110 illustrated in FIG. 6, and includes a button 110A, a button 110B, and a button 110C. When the button 110A is pressed, the posture of the robot 101 is synchronized with the posture of the virtual robot 106 in simulation. When the button 110B is pressed, the posture of the virtual robot 106 in the virtual environment is matched to the posture of the robot 101. When the button 110C is pressed, the operation instruction to the robot 101 is canceled, and the jogging operation in simulation is continued. The confirmation popup is not limited to that for issuing an operation instruction to any one of the robot 101 and the virtual robot 106, and a user can arbitrarily set any confirmation popup.

Figure 12:
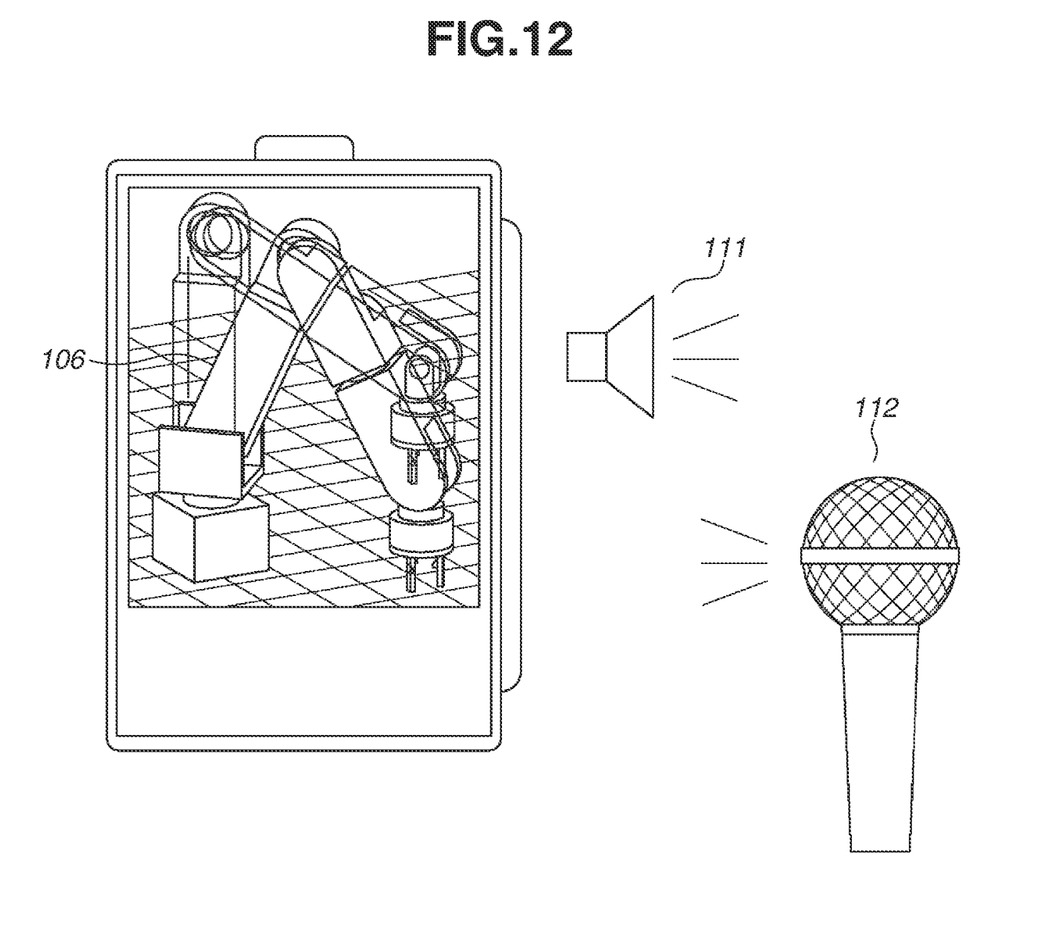
FIG. 12 is a schematic diagram illustrating audio confirmation.

As illustrated in FIG. 12, an operation instruction can be issued to the robot 101 or the virtual robot 106 in the virtual environment, using a speaker 111 mounted in the TP 103, and a microphone 112. As for the operation instruction, for example, it is possible to ask by voice the contents described above with reference to FIG. 11, i.e., "Do you want to move the actual machine to the position of the model?" or "Do you want to take the position of the actual machine into the model?", and execute the instructed operation. The actual machine indicates the robot 101. As described above, by making confirmation via the display on the screen or the voice, it is possible to prompt a user's operation when the mode is to be changed, and to perform the operation without erroneous operations and errors.

In addition, the posture of the robot 101 before being changed can be displayed by dotted lines in the virtual environment, and the posture of the robot 101 while being changed can be displayed in the virtual environment.

The embodiments described above can be appropriately modified and changed without departing from the spirit and scope of the technological thought. For example, a plurality of the embodiments and their modification examples can be combined and implemented. In addition, some of the elements of at least one of the embodiments can be removed or replaced.

A new element can be added to at least one of the embodiments. The contents of the present disclosure include not only the contents described explicitly in the present disclosure, but also all the contents understandable from the present disclosure and the drawings attached to the present disclosure.

All the processing procedures described above executed by the control unit are executed specifically by the calculation unit 301. Accordingly, the present disclosure can be configured to read and execute a software program stored in a recording medium that can implement the above-described functions. In this case, the program itself read from the recording medium implements the functions of each embodiment described above, and the program itself and the recording medium recording the program configure the present disclosure.

In each of the embodiments, the description is given of the case where the computer-readable recording medium is the ROM, the RAM, or the flush ROM, and the program is stored in the ROM, the RAM, or the flush ROM. However, the present disclosure is not limited to the embodiments. The program for implementing the present disclosure may be stored in any recording medium as long as it is a computer-readable storage medium. For example, an HDD (or SSD), an external storage device, a recording disk may be used as a recording medium for supplying the control program.

In the above-described various embodiments, the description is given of the case where the multi-jointed robot arm having a plurality of joints is used, but the number of the joints is not limited to the number as described in the embodiments. As the form of the robot arm, the vertical multi-axis configuration is exemplified, but the configurations described above can be implemented in different types of joints of a horizontal multi-joint type, a parallel link type, and an orthogonal robot type.

The above-described embodiments can be applied to machines that can automatically perform operations or combined operations of expansion and contraction, bending and stretching, vertical movement, horizontal movement, and/or rotational movement, based on the information stored in the storage device provided in the control apparatus 102.

The present disclosure can also be realized by processing of supplying a program for implementing the one or more functions of the above-described embodiments to a system or an apparatus via a network or a storage medium, and one or more processors in a computer of the system or the apparatus reading and executing the program. The present disclosure can also be realized by a circuit (e.g., application specific integrated circuits (ASIC)) that can implement the one or more functions.

The present disclosure is not limited to the above-described embodiments, and can be modified and changed within the technical concept according to the present disclosure. The effects described in the embodiments are merely examples of the preferred effects generated from the present disclosure, and the effects of the present disclosure are not limited to those described in the embodiments of the present disclosure. The various embodiments described above and modification examples may be combined and implemented.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Applications No. 2022-157704, filed Sep. 30, 2022, and No. 2023-110814, filed Jul. 5, 2023, which are hereby incorporated by reference herein in their entirety.

What is claimed is:

1. An operation apparatus configured to communicate with a robot controller for controlling a robot, acquire a pressed state of an enable switch, display a virtual robot corresponding to the robot in a virtual environment, and operate the robot or the virtual robot, the enable switch being a three-position switch, the operation apparatus comprising:
at least one processor causes the operation apparatus to function as:
a determination unit configured to determine the pressed state of the enable switch; and
a mode execution unit configured to execute a first mode in a case where the pressed state of the enable switch determined by the determination unit is a first step or a third step, or execute a second mode in a case where the pressed state of the enable switch determined by the determination unit is a second step, the first mode being a mode in which the virtual robot displayed is operable but the robot is not operable, the second mode being a mode in which the robot is operable.

2. The operation apparatus according to claim 1, wherein the first step corresponds to a non-pressed state of the enable switch, the second step corresponds to a half-pressed state of the enable switch, and the third step corresponds to a full-pressed state of the enable switch.

3. The operation apparatus according to claim 1, wherein the operation apparatus confirms whether to issue an operation instruction when the enable switch is pressed in a case where a posture of the virtual robot and a posture of the robot are different.

4. The operation apparatus according to claim 1, wherein a confirmation screen is displayed on a screen of the operation apparatus to confirm whether to issue an operation instruction to any one of the robot and the virtual robot.

5. The operation apparatus according to claim 1, wherein an operation instruction is issued to any one of the robot and the virtual robot by voice or sound.

6. The operation apparatus according to claim 1, wherein a model of the robot is displayed in the virtual environment when the virtual robot is operated.

7. The operation apparatus according to claim 6, wherein the model of the robot is displayed in a semi-transparent manner.

8. The operation apparatus according to claim 1, wherein a posture of the virtual robot is displayed in synchronization with a posture of the robot when the robot is operated.

9. The operation apparatus according to claim 1, wherein a posturer of the virtual robot is synchronized with a posture of the robot when the pressed state of the enable switch is switched from the second step to the first step or switched from the second step to the third step.

10. The operation apparatus according to claim 1, wherein the virtual environment is displayed on a screen of the operation apparatus.

11. The operation apparatus according to claim 1, wherein the enable switch is provided as an independent apparatus.

12. The operation apparatus according to claim 1, further comprising a mode change switch different from the enable switch and configured to be used to switch a state between a state in which the robot is operated and a state in which the virtual robot is operated,
wherein the processing unit switches the state from the state in which the virtual robot is operated to the state in which the robot is operated by the enable switch, and switches the state from the state in which the robot is operated to the state in which the virtual robot is operated by the mode change switch.

13. The operation apparatus according to claim 1, wherein a posture of the robot at a time at which the robot starts moving is displayed with a dotted line when the robot is operated.

14. The operation apparatus according to claim 13, wherein the dotted line and the posture of the robot being moved are displayed when the robot is operated.

15. A robot system comprising:
the operation apparatus according to claim 1; and
the robot.

16. Manufacturing method of manufacturing an article using the robot system according to claim 15.

17. A control method of a robot system for controlling the robot in the robot system according to claim 15 in accordance with an instruction issued by the operation apparatus.

18. A manufacturing method comprising:
manufacturing an article by the robot operated by the operation apparatus according to claim 1 and a manufacturer of the article in cooperation.

19. The operation apparatus according to claim 1, wherein switching to the second mode is possible by putting the enable switch into the second step during execution of the first mode.

20. The operation apparatus according to claim 1, wherein operation of the robot is disabled by cutting off power to the robot in the first mode.

21. A control method of an operation apparatus configured to operate a robot, including a determination unit configured to determine a pressed state of an enable switch, and configured to operate the robot or a virtual robot, the enable switch being a three-position switch, the control method comprising:
displaying the virtual robot corresponding to the robot in a virtual environment; and
executing a first mode in a case where the pressed state of the enable switch determined by the determination unit is a first step or a third step, or executing a second mode in a case where the pressed state of the enable switch determined by the determination unit is a second step, the first mode being a mode in which the virtual robot displayed is operable but the robot is not operable, the second mode being a mode in which the robot is operable.

22. A non-transitory computer-readable recording medium recording a control program for causing a computer to execute the control method according to claim 21.

* * * * *